Figure 1:
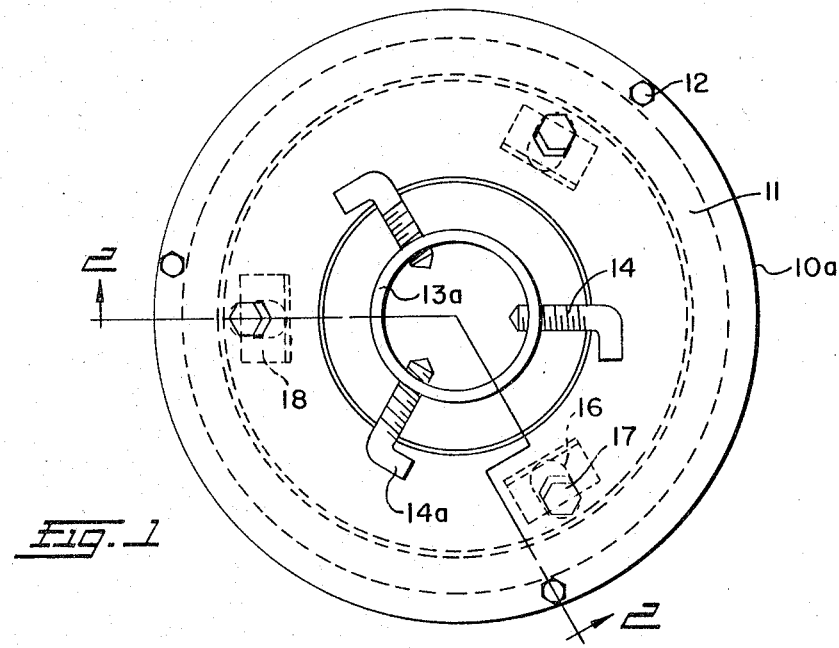

Jan. 17, 1967 A. J. TAYLOR 3,298,643
TREE STAND
Filed April 8, 1965 2 Sheets-Sheet 1

INVENTOR
ALBERT J. TAYLOR

BY
McNenny, Farrington, Pearne & Gordon
ATTORNEYS

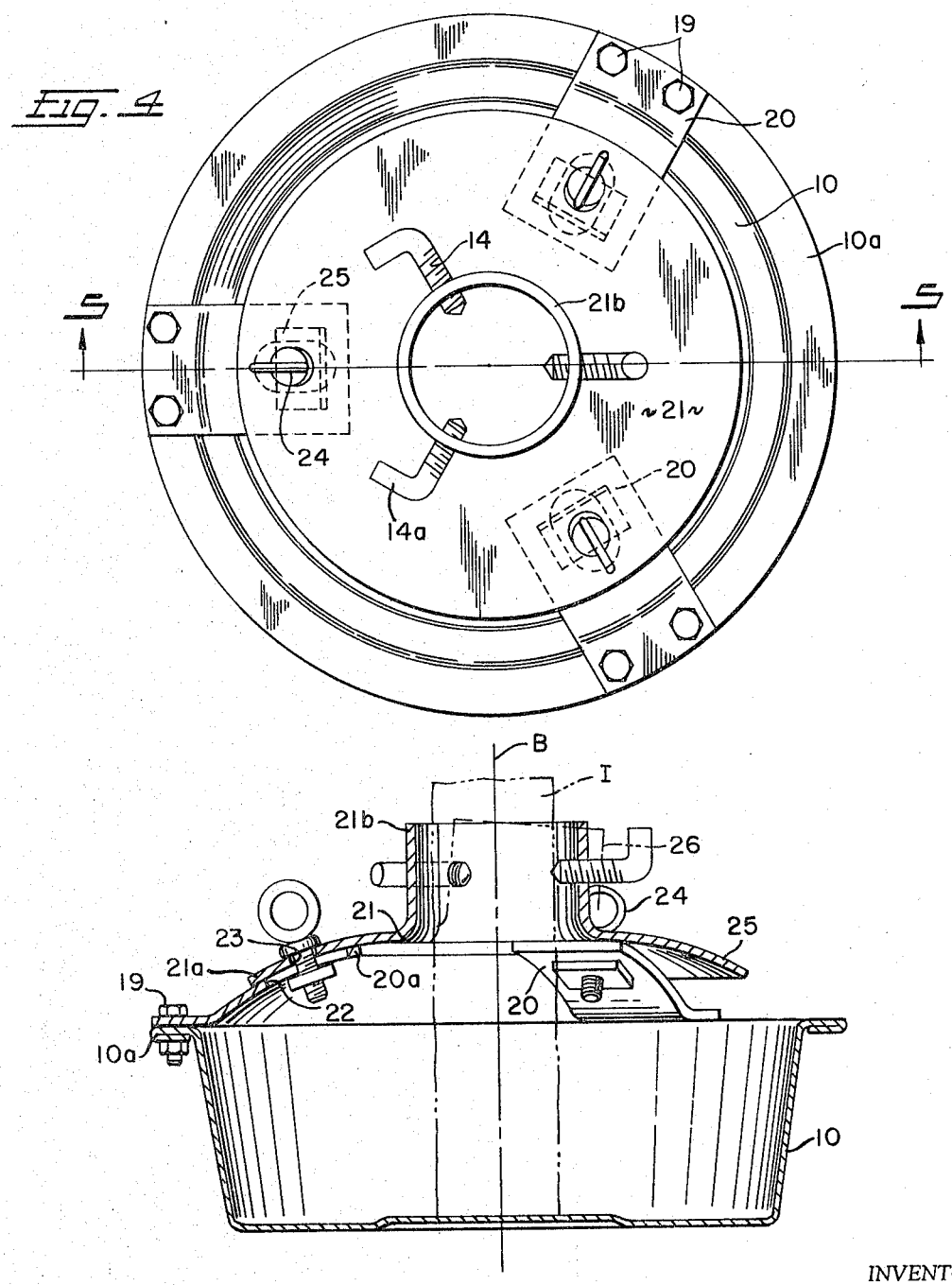

United States Patent Office 3,298,643
Patented Jan. 17, 1967

3,298,643
TREE STAND
Albert J. Taylor, 8288 Wilson Mills Road,
Chesterland, Ohio 44026
Filed Apr. 8, 1965, Ser. No. 446,495
7 Claims. (Cl. 248—44)

The present invention relates to a stand and, more particularly, to an improved stand or support for a tree or the like.

As indicated, the present stand may be used to support a tree or other like longitudinally-extending upright members, such as a pole as in the case of a flagpole. For purposes of illustration only, the invention is described in detail in connection with supporting the trunk or bole of a tree.

A number of supports for trees, notably Christmas trees, has been suggested. Such supports are rather complicated in both structure and manner of use. Often, two or more persons are required to hold either the tree or parts of the support in order to mount the tree. Normally, difficulty arises in that the entire assembly of parts, including the tree and all or most all of the disassembled parts of the stand, must be manually held together in a cumbersome manner, while another tightens the parts of the stand until the tree becomes rigidly and integrally a part of the stand or support.

Moreover, after a tree is initially mounted, it frequently becomes apparent that the tree is not vertically centered but lies at a certain angle of inclination from the vertical. It is then necessary to loosen the parts of the stand once more to adjust the tree to a more pleasing vertical position. Again, the difficulty and inconvenience of struggling with the tree and the parts of the stand are repeated.

A single person can easily mount a tree in my stand. It is necessary only to place the but end of a tree trunk within a receiving collar or the like of the present stand and then to tighten fasteners to make the tree and stand an integral structure. Moreover, the present stand can adjustably position the tree in any direction within a vertical, inverted, generally conically shaped area. Such an adjustment to compensate for misalignment or the like is also very easily accomplished with the present invention by a single person and by only slightly loosening certain parts of the stand.

It is therefore a principal object of the present invention to provide an improved stand for a tree, pole, or the like.

Another object is to provide a tree stand or support by which the vertical disposition of the tree may be easily adjusted.

A further object of the invention is to provide a tree stand or support that is simple in construction, economical to manufacture, and simple and efficient to use.

A still further object is to provide a tree stand or support in which attaching means may, if desired, be fixed to a tree while such means is separated from the other parts of the stand.

Figure 2:
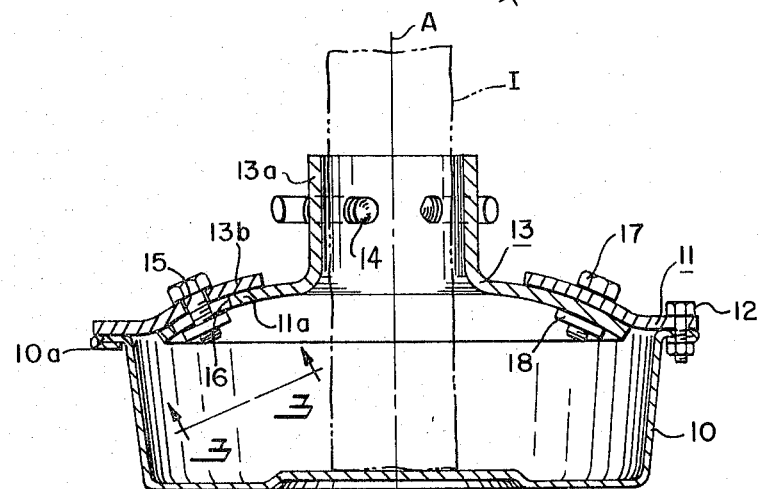
Figure 3:
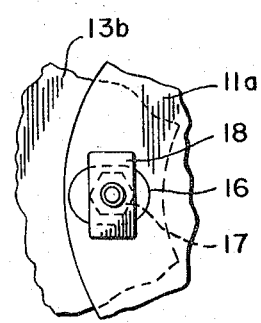

Other objects and advantages of the invention will be apparent from the following description and drawings wherein:

FIGURE 1 is a plan view of one form of the invention;
FIGURE 2 is an offset section of FIGURE 1 on the line 2—2;
FIGURE 3 is a fragmentary section of FIGURE 2 on the plane of the line 3—3;
FIGURE 4 is a plan view of another form of the invention; and
FIGURE 5 is an offset section of FIGURE 4 on the line 5—5.

In general, the illustrated embodiments, which are intended to be only exemplary of the invention, for supporting a tree or the like include a base and attaching means which are fixed with respect to the base. A support member, adapted to be secured to a tree, and the attaching means have overlapping surface portions that are moveable with respect to each other in a sliding relation. Fasteners secure the attaching means and support member together at a desired relative position of the overlapping surface portions. The base is preferably a receptacle or vessel adapted to contain a nutrient such as water, aqueous sugar solutions, soil, or the like. The adjustable positioning of the overlapping surface portions of the parts indicated permits, in turn, adjustable positioning of a tree with respect to the base and particularly varying the angle of inclination of the tree from the vertical. In accordance with the present invention, it is possible to secure the described support member to a tree or the like while the member is separated from the remaining parts of the stand assembly. Subsequently, the tree with the support member already secured thereto, may then be mounted with respect to the base. Alternatively and preferably, the tree may be secured to the support member while such member is already in assembly with other parts of the stand, and fasteners may then be tightened to secure the tree with respect to the support member and such other parts.

For example, referring to the embodiment of FIGURES 1 through 3, a receptable or pan 10 adapted to contain a nutrient has a plate 11 in the form of an annulus fixed to a flange 10a of the pan as by bolt and nut combinations generally indicated at 12. A further plate 13 also in the general form of an annulus has an open upright collar 13a at a central area portion. The collar has radially extending threaded openings to receive pointed screws 14. Although here and the other embodiment, the screws 14 are shown as having bent ends 14a for turning the screws, it is understood that slotted screws for use with a screwdriver, or screws with heads of polygonal cross section for use with a wrench may also be used.

As shown particularly by FIGURE 2, the plates 11 and 13 are bowed upwardly, resulting in outwardly and upwardly convexly-curved portions 11a and 13b, respectively. These portions overlap or override each other in contacting relation, so that plate portion 11a may slide relatively to plate portion 13b. To facilitate this action, the indicated portions 11a and 13b are preferably of the same degree of curvature.

Fasteners are used to hold plates 11 and 13 together and especially to fix the plate portions 11a and 13b at a desired relative position. In the embodiment shown, plate 11 has a series of spaced openings 15, and plate 13 similarly has a series of spaced openings 16. The openings of each plate are spaced about 120 degrees apart and in substantial alignment with an opening of a companion plate. One of the two associated openings is oversized with respect to its companion. For example, as shown in FIGURE 2 and 3, the opening 16 of plate 13 is oversized with respect to the opening 15 of plate 11. A bolt 17 passes through each of the aligned openings 15 and 16 and engages a threaded opening of a keeper strip 18. As shown especially by FIGURE 3, the strips 18 are of sufficient length to extend beyond the sides of the lower, oversized opening 16.

FIGURES 4 and 5 illustrate several modifications for the present tree stand. Instead of using as the attaching means a plate 11 which extends a full 360 degrees around the pan or receptacle 10 as in the embodiment of FIGURES 1 through 3, the embodiment of FIGURES 4 and 5 employs spaced strips 20 which extend radially inwardly of the pan 10. The strips 20 are secured at their outer ends to a flange 10a of the pan, as by bolt and nut combinations 19, while the inner ends of the strips 20 are upwardly and outwarly convexly curved to define portions 20a which correspond functionally to those portions 13b of the embodiment of FIGURES 1 to 3. The portions 20a slidably contact overlying, similarly curved portions 21a of a disc 21 having an upstanding, open collar 21b. The collar has radially extending threaded openings to receive the pointed screws 14. It will be noted that the disc 21 overlies the strip 20, while in the embodiment of FIGURES 1 through 3, the plate 13 containing the collar was underslung with respect to the annular plate 11. Either positioning is contemplated by the present invention, although for the sake of appearance, the underlying member usually has the oversized openings.

Thus, as illustrated in FIGURE 5, each strip 20 has an opening 22 which is oversized with respect to an overlying opening 23 in the disc 21. An eyebolt 24 passes through each of the aligned openings 23 and 22 to engage a threaded opening of a keeper strip 25. The use of eyebolts facilitates turning of the bolts by hand.

In use, either the palte 13 of FIGURE 2 or the disc 21 of FIGURE 5 may be removed from its attendant component parts of the stand and then slipped around the butt end of a tree trunk T. In the case of the embodiment of FIGURE 2, the annulus 13 may also be removed at this time. When the plate 13 or disc 21 is suitably located about the tree, the screws 14 are tightened to fix the collar relatively to the tree. Alternatively, with the plate 13 or disc 21 in place as shown in the drawings and with the screws 14 withdrawn or substantially so, the tree may be inserted through the collars of the indicated parts and allowed to come to rest upon the bottom of the pan or receptacle 10. Thereafter, the screws 14 are tightened. This technique of assembly has the advantage of automatically engaging the collar portion of either plate 13 or disc 21 at a desired axial position along the tree trunk.

For such mounting as last described, the blots 17 or 24 may already be tightened, so that simply tightening the screws 14 completes mounting the tree in the stand. Should, however, the tree upon inspection be inclinded somewhat from the vertical, the user need only loosen the bolts 17 or 24 to slide the plate 13 or disc 21 with respect to the plate 11 or strips 20, respectively, and thereby tilt the collar portions 13a or 21b and an attached tree T away from a vertical axis A (FIGURE 2) or an axis B (FIGURE 5) to a position, for example, as shown by the phantom lines generally indicated at 26 in FIGURE 5. To a limited degree, depending upon the size of the openings 15 and 16 or 22 and 23, in the overiying, overriding curved portions of the parts indicated, the plate 13 or disc 21 may be turned about their respective vertical axes A or B. After such tilting and/or turning, the bolts 17 or 24 are tightened, and the position of the plate 13 or disc 21 and its attached tree is fixed with respect to the remaining parts of the stand.

It is emphasized that the steps of assembly for either of the embodiments illustrated and described are easily carried out by a single person. While the foregoing describes alternative embodiments, it is understood that the invention may be practiced in still other forms within the scope of the following claims.

I claim:

1. A support for a tree or the like comprising a base, attaching means fixed with respect to the base, a support member adapted to be secured to a tree, said attaching means and support member having overlapping curved surface portions effective to provide a relative sliding action therebetween, and means to secure the attaching means and support member together at a desired relative position of said overlapping surface portions.

2. A support for a tree or the like comprising a base, attaching means fixed with respect to the base, a support member having an opening to receive therein a tree for securance thereto, said attaching means and support member having overlapping, substantially matching curved surface portions effective to provide a relative sliding action therebetween, and fastening means to secure the surface portions together in a desired overlapping relation.

3. A support for a tree or the like comprising a base, attaching means fixed with respect to the base, a support member having a collar portion to receive a tree, fastening means to secure the collar to a tree, said attaching means and support member having overlapping curved surface portions effective to provide a relative sliding action therebetween, and further fastening means acting upon the curved surface portions to secure one to the other in a desired overlapping relation.

4. A support for a tree or the like comprising a receptacle adapted to contain a nutrient, bridging attaching means fixed with respect to the receptacle, an outwardly bowed plate member having an upstanding collar portion to receive therein a tree, fastening means on the collar to secure it to a tree, said attaching means and plate member having overlapping contacting portions of substantially like curvature to provide a relative sliding action therebetween, and further fastening means passing through the overlying surface portions to secure one to the other in a desired overlapping relation.

5. The support of claim 4 wherein said attaching means is in the form of an annulus, the upstanding collar portion of the plate member passing through the opening of said annulus.

6. The support of claim 4 wherein said attaching means is in the form of strip members extending inwardly of the receptacle and having curved inner ends defining the overlapping contacting surface portion of the attaching means.

7. A support for a tree or the like comprising a receptacle adapted to contain a nutrient, bridging attaching means fixed with respect to the receptacle and having an outwardly and upwardly convexly-curved surface area, a plate having an upstanding collar portion to receive therein a tree, fastening means on the collar to secure it to a tree, at least the peripheral surface area of said plate also being outwardly and upwardly convexly-curved and overlapping in substantially mating curvature the convexly-curved surface area of the attaching means to provide a relatively sliding action between the attaching means and plate and in the plane of such curvature, said overlapping surface areas of the attaching means and plate having substantially aligned openings, one opening being oversized with respect to its substantially aligned opening, and fastening means passing through the substantially aligned openings to fix the overlapping surface areas to each other in a desired relative position.

References Cited by the Examiner

UNITED STATES PATENTS

| 2,931,604 | 4/1960 | Weddle | 248—44 |
| 3,052,437 | 9/1962 | Schoen | 248—44 |

FOREIGN PATENTS

| 534,206 | 12/1956 | Canada. |
| 521,389 | 3/1931 | Germany. |

CLAUDE A. LE ROY, *Primary Examiner.*

J. F. FOSS, *Assistant Examiner.*